United States Patent
Kuroiwa et al.

(10) Patent No.: US 8,375,827 B2
(45) Date of Patent: Feb. 19, 2013

(54) BICYCLE CRANK ASSEMBLY

(75) Inventors: Eigo Kuroiwa, Sakai (JP); Masahiro Yamanaka, Sakai (JP)

(73) Assignee: Shimano Inc., Osaka (JP)

( * ) Notice: Subject to any disclaimer, the term of this patent is extended or adjusted under 35 U.S.C. 154(b) by 278 days.

(21) Appl. No.: 12/871,118

(22) Filed: Aug. 30, 2010

(65) Prior Publication Data

US 2012/0048058 A1 Mar. 1, 2012

(51) Int. Cl.
*B62M 3/00* (2006.01)

(52) U.S. Cl. ........................ 74/594.1; 280/259

(58) Field of Classification Search ...... 74/594.1–594.5, 74/321, 38; 403/359.1–359.6, 298, 393; 464/88, 182; 384/545, 431, 458; 280/259, 280/260, 261; 81/60; 301/124.2; *B62M 3/00*
See application file for complete search history.

(56) References Cited

U.S. PATENT DOCUMENTS

| | | | |
|---|---|---|---|
| 5,243,879 | A | 9/1993 | Nagano |
| 6,899,402 | B2 * | 5/2005 | Chiang et al. ............ 301/124.2 |
| 7,160,195 | B2 * | 1/2007 | Lyon .......................... 464/179 |

FOREIGN PATENT DOCUMENTS

| | | |
|---|---|---|
| EP | 1 726 517 A1 | 11/2006 |
| ER | 1 935 773 A1 | 6/2008 |

OTHER PUBLICATIONS

EP Serach Report of corresponding EP Application No. 11 16 1798.1 dated Oct. 7, 2011.

* cited by examiner

*Primary Examiner* — James Pilkington
*Assistant Examiner* — Richard Urbanski
(74) *Attorney, Agent, or Firm* — Global IP Counselors, LLP

(57) ABSTRACT

A bicycle crank assembly is provided with a crank arm including a front side surface and a back side surface. The crank arm has a crank axle mounting portion with a crank axle receiving opening defined by an axle coupling structure. The axle coupling structure at least includes a plurality of full length splines and at least one short spline. The full length splines extends completely in an axial direction of the crank axle receiving opening from a first axial end edge to a second axial end edge. The short spline extends in the axial direction with a truncated end positioned adjacent one of the first and second axial end edges such that the at least one short spline does not extend completely from the other of the first and second axial end edges to the one of the first and second axial end edges.

25 Claims, 10 Drawing Sheets

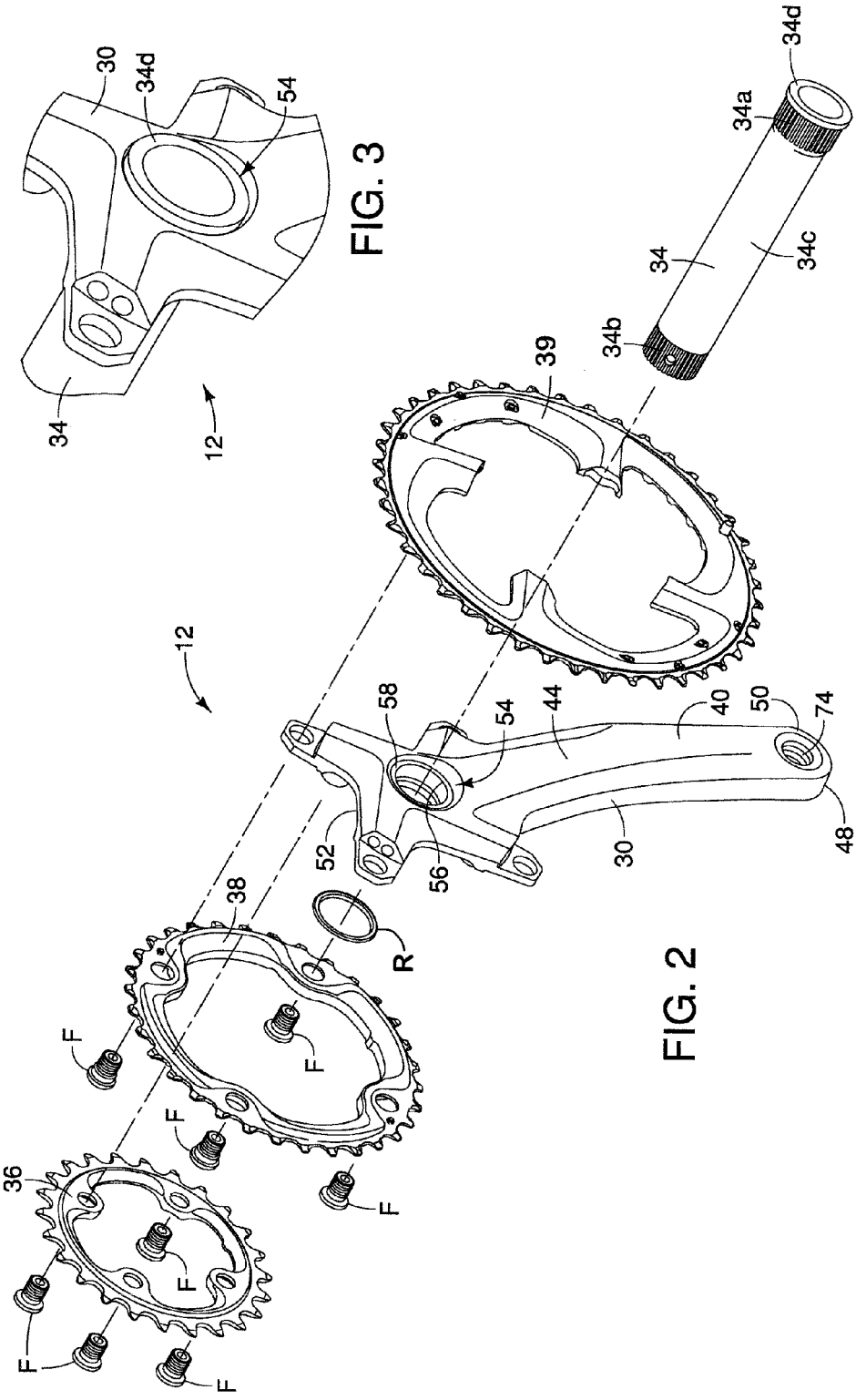

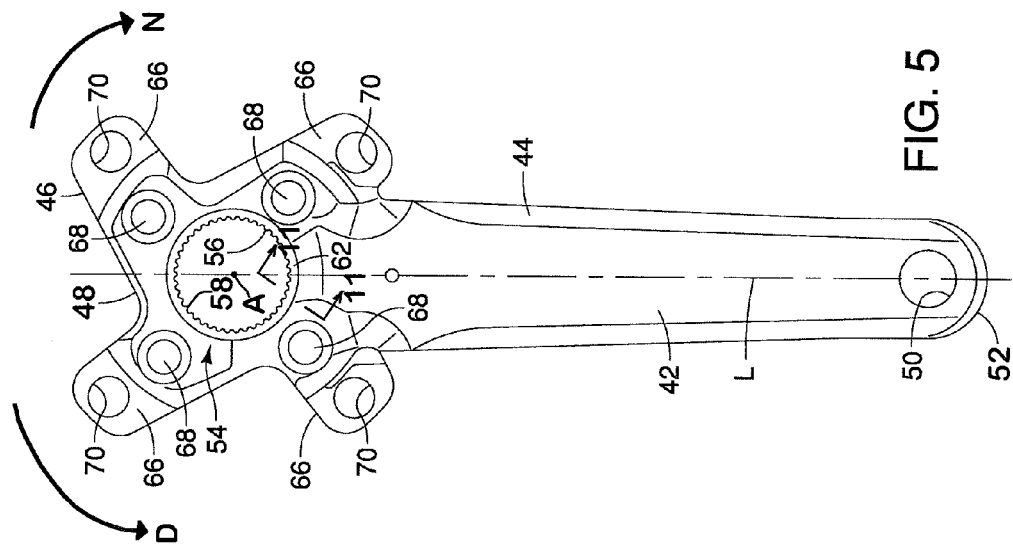
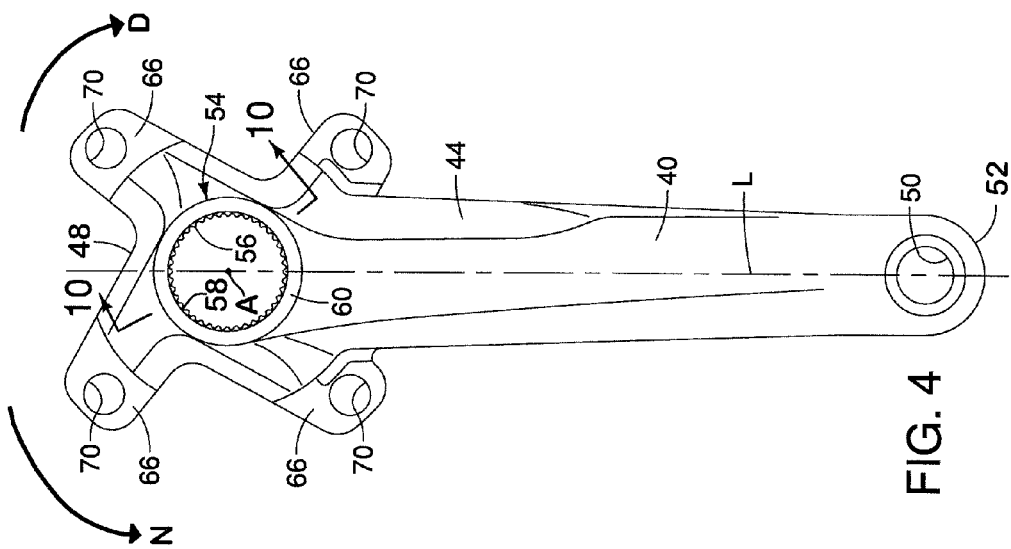

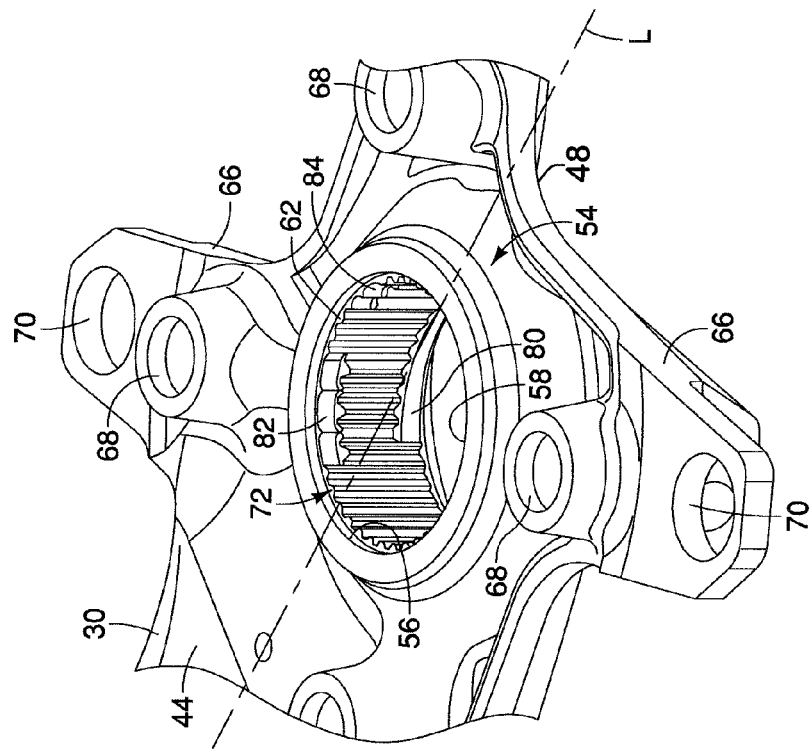
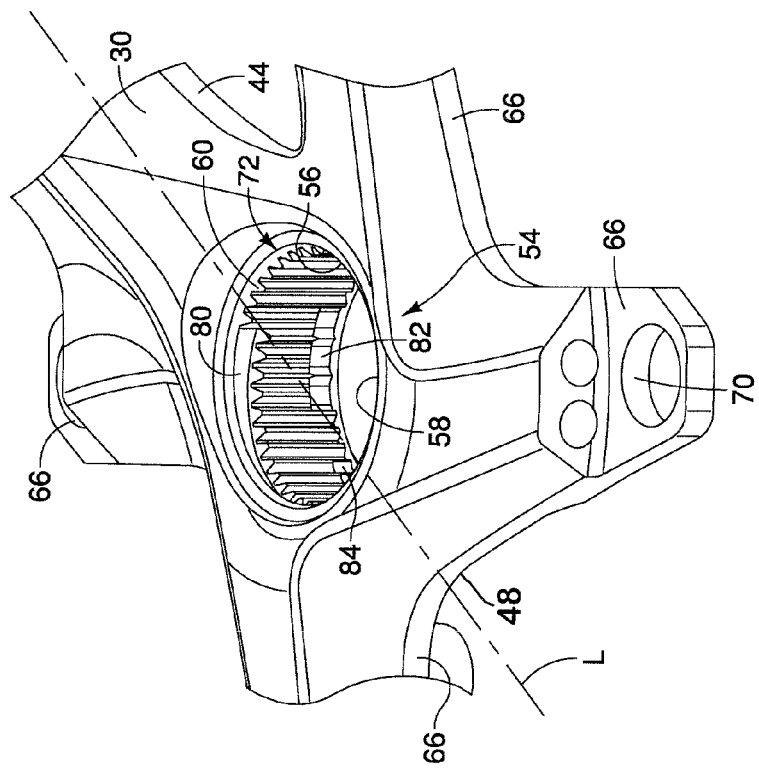

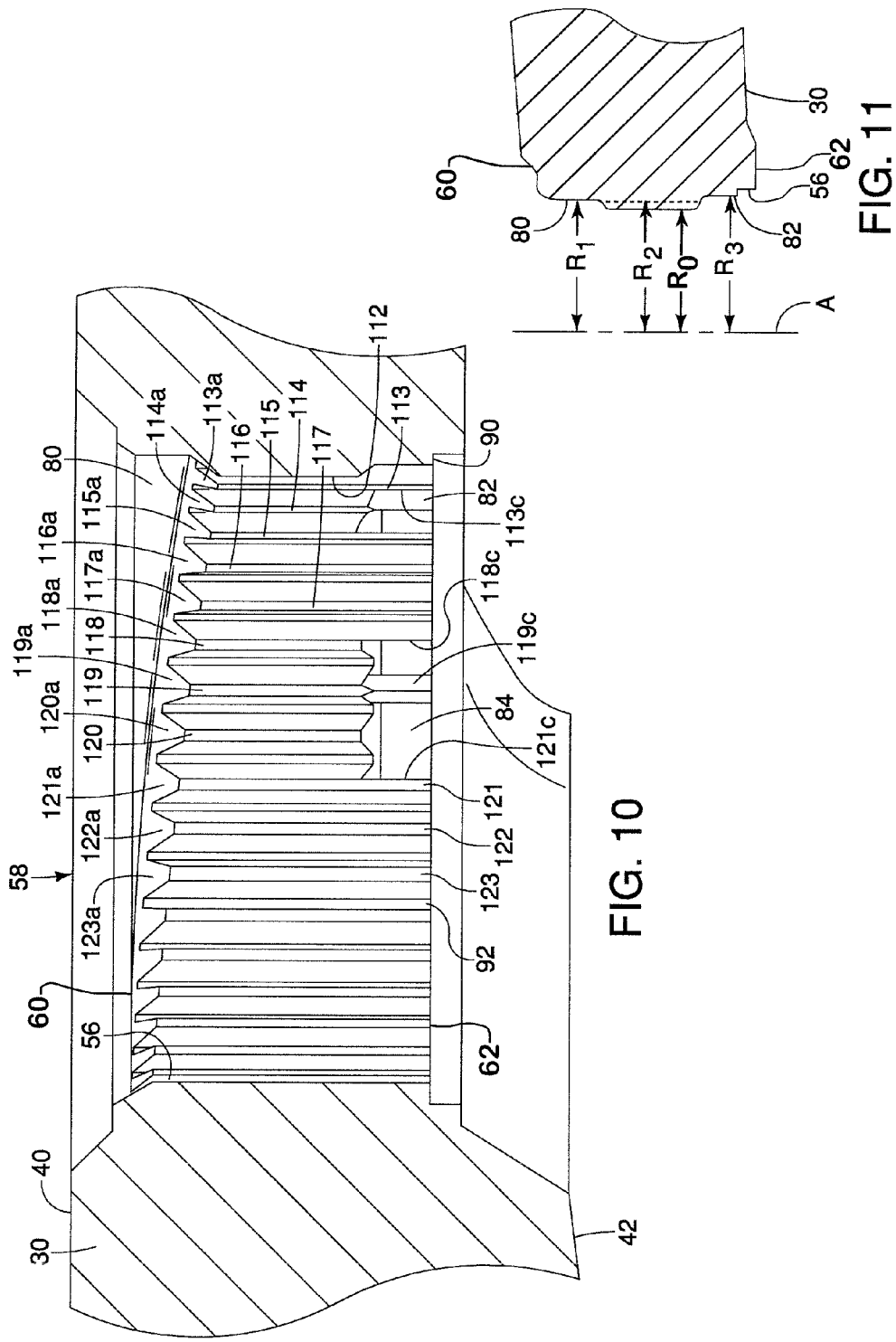

BICYCLE CRANK ASSEMBLY

BACKGROUND

1. Field of the Invention

This invention generally relates to a bicycle crank assembly. More specifically, the present invention relates to a bicycle crank assembly with an axle coupling structure for coupling a crank axle to a crank arm.

2. Background Information

A bicycle crank arm is a component for connecting a pedal to a crank axle. In the case of a right crank arm, one or more chain rings is attached to the crank arm for transmitting a pedaling force from the pedal to a chain. The crank arm should have high strength in order to prevent damage or deformation despite the crank arm being repeatedly subjected to loads from the pedal, and high rigidity in order to prevent deformation or flexing when the pedal is depressed. The crank arm is preferably also designed to be as lightweight as possible in order to reduce the weight of the entire bicycle. Often, a spline type connection is provided for coupling the crank axle to the crank arm. In this way, the pedaling force transmitted from the crank arm to the crank axle via the spline type connection between the crank arm and the crank axle. The spline type connection is subjected to a large stress during a power portion of the pedaling motion.

SUMMARY

One aspect is to provide a bicycle crank assembly with an axle coupling structure for coupling a crank axle to a crank arm such that stress concentration occurring during pedaling is reduced.

In view of the state of the known technology, a bicycle crank assembly is provided with a crank arm including a front side surface and a back side surface. The crank arm has a crank axle mounting portion with a crank axle receiving opening defined by an axle coupling structure. The axle coupling structure has a first axial end edge adjacent the front side surface of the crank arm and a second axial end edge adjacent the back side surface of the crank arm. The axle coupling structure at least includes a plurality of full length splines and at least one short spline. The full length splines extends completely in an axial direction of the crank axle receiving opening from the first axial end edge to the second axial end edge. The short spline extends in the axial direction with a truncated end positioned adjacent one of the first and second axial end edges such that the at least one short spline does not extend completely from the other of the first and second axial end edges to the one of the first and second axial end edges.

BRIEF DESCRIPTION OF THE DRAWINGS

Referring now to the attached drawings which form a part of this original disclosure:

FIG. 2 is an exploded perspective view of the right bicycle crank assembly illustrated in FIG. 1 that includes a right bicycle crank arm and a crank axle;

FIG. 3 is a perspective view of a portion of the right bicycle crank assembly showing the crank-axle in press-fit engagement with a axle coupling structure of the right bicycle crank arm illustrated in FIG. 1;

FIG. 4 is an outboard or front side elevational view of the right bicycle crank arm illustrated in FIGS. 1 and 2;

FIG. 5 is an inboard or back side elevational view of the right bicycle crank arm illustrated in FIGS. 1 to 4;

FIG. 6 is a front side perspective view of a portion of the right crank arm illustrated in FIGS. 1 to 5 with the crank axle removed, showing the front side of the axle coupling structure;

FIG. 7 is a back side perspective view of a portion of the right crank arm illustrated in FIGS. 1 to 5, showing the back side of the axle coupling structure;

FIG. 10 is an enlarged cross-sectional view of a portion of the right bicycle crank arm illustrated in FIGS. 1 to 5 as seen along section line 10-10 of FIG. 4;

FIG. 11 is an enlarged cross-sectional profile of one of the short splines of the axle coupling structure of the right bicycle crank arm illustrated in FIGS. 1 to 5 as seen along section line 11-11 of FIG. 5;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
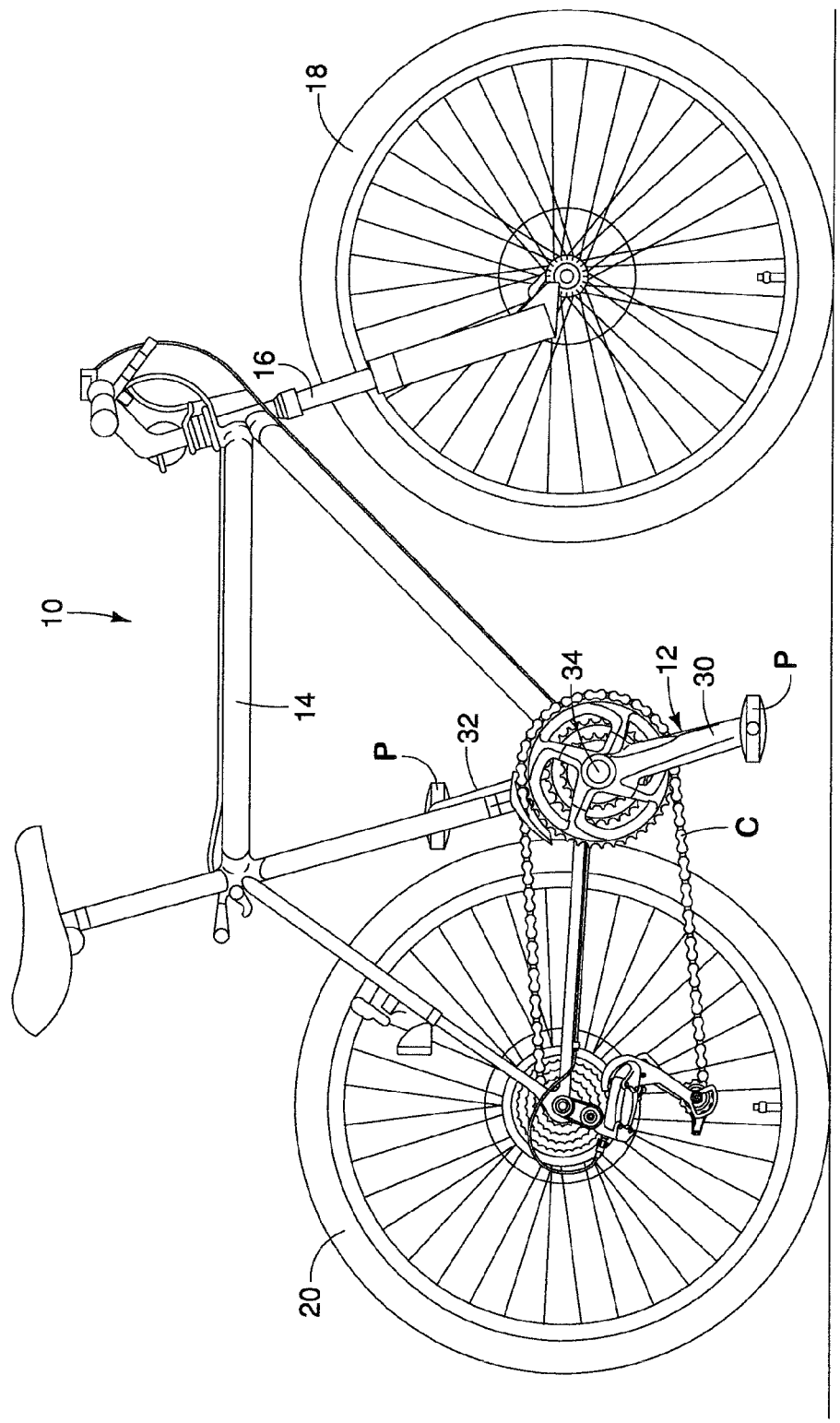
FIG. 1 is a side elevational view of a bicycle that is equipped with a right bicycle crank assembly in accordance with one embodiment.

Referring initially to FIG. 1, a bicycle 10 is illustrated that is equipped with a bicycle crank assembly 12 in accordance with a first embodiment. The bicycle 10 has a diamond-shaped frame 14 with a front fork 16 pivotally coupled thereto. The crank assembly 12 is mounted to the frame 14 in a conventional manner as explained below. A front wheel 18 is mounted to the front fork 16, while a rear wheel 20 is mounted to the rear end of the frame 14. Basically, the crank assembly 12 is supported on a bottom bracket shell of the frame 14. The bottom bracket shell is formed at the intersection of a seat tube, a down tube and a rear chain stays of the frame 14.

As seen in FIGS. 1 and 2, the bicycle crank assembly 12 basically includes a right crank arm 30, a left crank arm 32 (FIG. 1 only) and a crank axle 34. In the illustrated embodiment, the bicycle crank assembly 12 further includes three chain rings 36, 38 and 39 that are fixedly mounted to the right crank arm 30 in a conventional manner. As seen in FIG. 1, pedals P are mounted to the free end of each of the crank arms 30 and 32 so the rider can rotate the crank arms 30 and 32 to propel the bicycle 10 in a conventional manner. The right crank arm 30 is rotated in a clockwise direction as viewed from the right side of the bicycle 10 to drive the bicycle chain C for propelling the bicycle 10 in a conventional manner. This clockwise direction is referred to herein as a driving force direction D (FIGS. 4, 5, 8 and 9) of the right crank arm 30, while the counterclockwise direction is referred to herein as a non-driving force direction N of the right crank arm 30.

The crank axle 34 is rotatably supported to the bottom bracket shell by a bottom bracket structure in a conventional manner. The crank axle 34 includes a plurality of axially extending first splines 34a disposed at a first (right) end portion of the crank axle 34, and a plurality of axially extending second splines 34b disposed at a second (left) end portion of the crank axle 34. In the depicted embodiment, the first splines 34a are configured and arranged to extend radially outward from an outer peripheral surface 34c of the crank axle 34, and the second splines 34b are configured and arranged not to protrude radially outward relative to the outer peripheral surface 34c of the crank axle 34. The second splines 34b may be tapered splines or non-tapered splines. The crank axle 34 is attached to the right crank arm 30 as discussed below. A flange 34d is provided at the first end portion of the crank axle 34, adjacent to the first splines 34a.

The crank arms 30 and 32 are non-rotatably mounted to opposite ends of the crank axle 34. As shown in FIG. 2, the crank axle 34 is preferably a hollow pipe-shaped member made of chrome-molybdenum steel or another such highly rigid alloy, for example. As shown in FIG. 3, the right end of the crank axle 34 is fixed to the right crank arm 30 by press-fitting to form a press-fitted engagement therebetween, such that the flange 34d contacts a portion of the front side surface 40 of the right crank arm 30. As used herein, the phrase "press-fitted engagement" refers to a connection in which two parts are fastened together by friction after the parts are longitudinally pushed together, rather than by any other means of fastening. More preferably, the friction of the press-fit connection that holds the two parts together is preferably increased by compression of one part against the other, which relies on the tensile and compressive strengths of the materials that the two parts are made from.

As seen in FIGS. 4 and 5, the right crank arm 30 includes a front side surface 40 (FIG. 4) and a back side surface 42 (FIG. 5). The right crank arm 30 has an elongated portion 44 with a chain ring mounting structure 46 disposed at a first end 48 and a pedal mounting structure 50 disposed at a second end 52. The right crank arm 30 has a crank axle mounting portion 54 with a crank axle receiving opening 56 defined by an axle coupling structure 58 disposed at the first end 48. The axle coupling structure 58 has a first axial end edge 60 adjacent the front side surface 40 of the right crank arm 30 and a second axial end edge 62 adjacent the back side surface 42 of the right crank arm 30. The crank axle receiving opening 56 defines a central axis A and the right crank arm 30 further defines a longitudinal axis L that extends from the first end 48 to the second end 52. Further, as seen in FIG. 2, an optional sealing structure (e.g., an elastomeric O-ring R) is often disposed at the crank axle receiving opening 56 (for example, adjacent to the second axial end edge 62 of the axle coupling structure 58). This O-ring R usually abuts against the second axial end edge 62 of the right crank arm 30.

As is best shown in FIGS. 4-7, the chain ring mounting structure 46 includes a plurality of projections 66 with blind holes 68 (FIGS. 5 and 7 only) and through holes 70. As indicated in FIGS. 5 and 7, the blind holes 68 are open to the back side surface 42, but, for example for appearance sake, do not extend through to the front side surface 40. The blind holes 68 receive fasteners F for securing the chain ring 36 to the back side surface 42 of the right crank arm 30 at the chain ring mounting structure 46. The through holes 70 are spaced radially outward from the blind holes 68 and extend from the back side surface 42 to the front side surface 40 of projections 66 of the chain ring mounting structure 46. The through holes 70 receive additional fasteners F that secure the chain rings 38 and 39 to the chain ring mounting structure 46. More specifically, the additional fasteners F extend through apertures in the chain ring 38, through the through holes 70 and into threaded blind holes (not shown) in the chain ring 39. Thus, the chain ring 38 is fixed to the back side surface 42 of the chain ring mounting structure 46 and the chain ring 39 is fixed to the front side surface 40 of the chain ring mounting structure 46.

It should be understood from the drawings and description herein, that the chain ring mounting structure 46 can be configured in a variety of ways. For example, in the depicted embodiment, there are four projections 66. However, the chain ring mounting structure 46 can alternatively include five projections 66. Further, the depicted embodiment includes the three chain rings 36, 38 and 40. Alternatively, the chain ring mounting structure 46 can be arranged to support only one chain ring, two chain rings or more than three chain rings. In other words, the right crank arm 30 is not limited to the specific configuration of the chain ring mounting structure 46 depicted in the drawings and described herein.

As best shown in FIG. 2, the pedal mounting structure 50 includes a threaded aperture 74 that is dimensioned to receive a threaded axle of the right pedal P. The threaded aperture 74 has a right-hand thread such that the axle of the right pedal P is threaded by rotating the axle of the right pedal P in a clockwise direction. The right pedal P extends outward from the front side surface 40 of the right crank arm 30 after attachment of the right pedal P. The left pedal P is attached to the left crank arm 32 in a similar manner as the right pedal P to the right crank arm 30. However, the left crank arm 32 has a pedal mounting structure with a threaded aperture having a left-hand thread.

The bicycle 10 depicted in FIG. 1 includes the right crank arm 30 and the left crank arm 32. As described above, the right crank arm 30 includes the chain ring mounting structure 46. The left crank arm 32 does not include a chain ring mounting structure such as the chain ring mounting structure 46 described above. However, the left crank arm 32 has an axle coupling structure similar that can include all of the features of the axle coupling structure 58 of the right crank arm 30, except that the axle coupling structure of the left crank arm 32 is a mirror image of the axle coupling structure 58 of the right crank arm 30, and is dimensioned to accommodate the second splines 34b of the crank axle 34. Hence, the description of the axle coupling structure 58 of the right crank arm 30 provided below can also apply to the axle coupling structure of the left crank arm 32.

As best indicated in FIGS. 6 and 7, the axle coupling structure 58 includes a plurality of full length splines 72 and a plurality of short splines that are described in greater detail below. The full length splines 72 extend completely in an axial direction of the crank axle receiving opening 56 from the first axial end edge 60 to the second axial end edge 62. The short splines do not extend completely from one of the first and second axial end edges 60 and 62 to the other of the first and second axial end edges 60 and 62, as described in greater detail below. The short splines include various truncated ends that define a first recessed area 80 (FIGS. 6 and 7), a second recessed area 82 (FIGS. 6 and 7) and a third recesses area 84 (FIG. 7). The full length splines 72 all have the same axial length, as indicated in the drawings. The short splines have various axial lengths and are described in greater detail below after a description of the first, second and third recessed areas 80, 82 and 84.

Each of the first recessed area 80, the second recessed area 82 and the third recessed area 84 constitutes a stress concentration relieving area of the right crank arm 30. More specifically, the first, second and third recessed areas 80, 82 and 84 are gaps or concaved regions of the crank axle receiving opening 56 of the axle coupling structure 58 that are strategically positioned to reduce concentrations of stress generated between the right crank arm 30 and the crank axle 34 during pedaling. In an alternative embodiment, the right crank arm 30 can be provided with only one of the first, second and third recessed areas 80, 82 and 84, as needed and/or desired. In another alternative embodiment, the right crank arm 30 can be provided with any two of the first, second and third recessed areas 80, 82 and 84. However as shown in the depicted arrangement, the right crank arm 30 can be provided with all three of the first, second and third recessed areas 80, 82 and 84.

Figure 8:
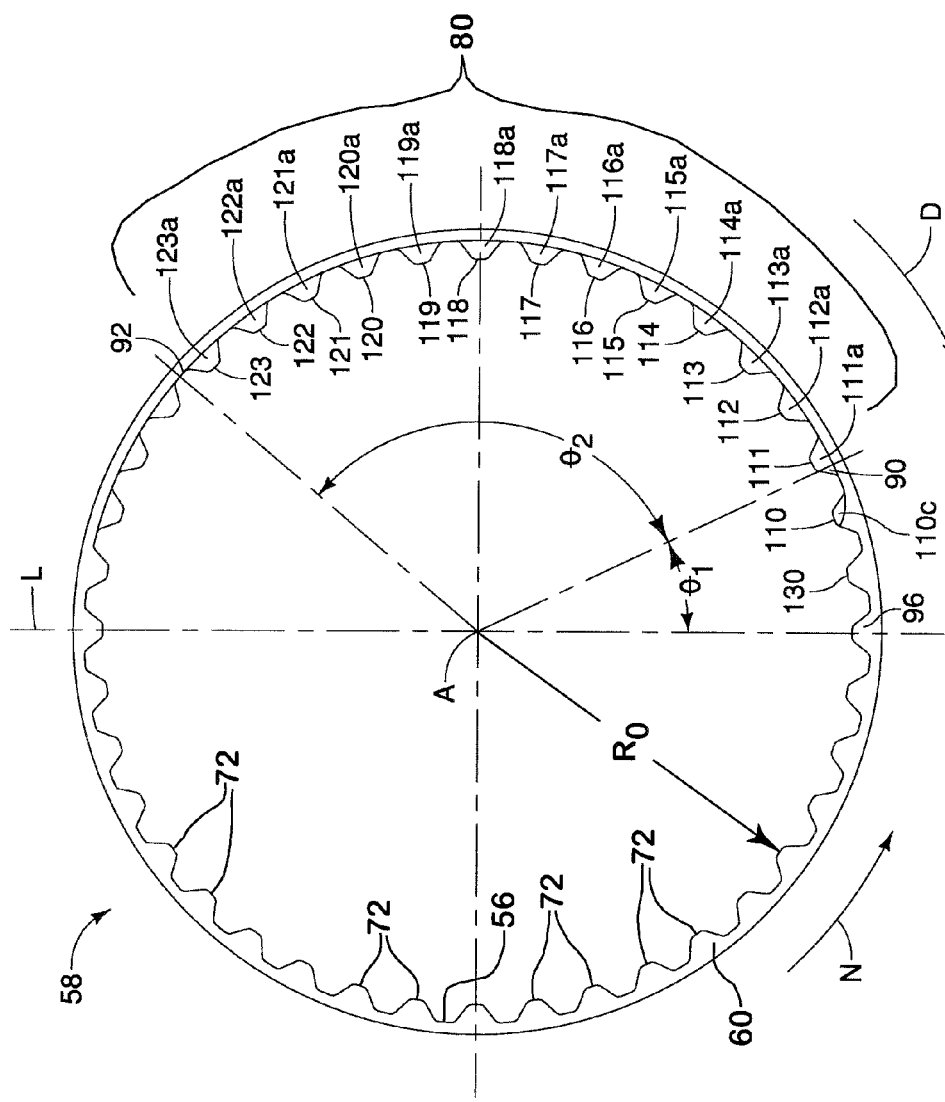
FIG. 8 is a front side schematic view of the axle coupling structure of the right crank arm illustrated in FIGS. 1 to 5.

As best shown in FIGS. 6, 8 and 10, the first recessed area 80 is an arc shaped recessed area that extends in a circumferential direction of the crank axle receiving opening 56 along the first axial end edge 60 of the axle coupling structure 58. On the other hand, in the illustrated embodiment, the second and third recessed areas 82 and 84 are circumferentially spaced apart along the second axial end edge 62 of the axle coupling structure 58, as indicated in FIGS. 7, 9 and 12-14.

FIG. 8 is a schematic view of the axle coupling structure 58 looking from the front side surface 40 of the right crank arm 30. As indicated in FIG. 8, the first recessed area 80 includes a starting point 90 positioned at a first circumferential location and an ending point 92 located at a second circumferential location relative to the central axis A. The longitudinal axis L of the right crank arm 30 passes through the central axis A of the crank axle receiving opening 56, as indicated in FIG. 8. The longitudinal axis L further intersects the crank axle receiving opening 56 at a first intersection 96 that is closest to the second end 52 (the pedal attachment end) of the right crank arm 30. The starting point 90 of the first recessed area 80 is positioned at a starting angle $\theta_1$ that is in a range between twenty degrees and thirty degrees as measured in the non-driving force direction N (opposite the driving force direction D) of the crank arm 30 from the first intersection 96. As is also indicated in FIG. 8, the first recessed area 80 extends through an angle $\theta_2$ that is preferably at least ninety-five degrees in the circumferential direction of the crank axle receiving opening 56 as measured between the starting point 90 and the ending point 92 of the first recessed area 80.

As shown in FIGS. 8 and 11, the full length splines 72 extend into the crank axle receiving opening 56 defining a radial depth $R_0$. As is best shown in FIG. 11, the first recessed area 80 has a radial depth $R_1$ that is at least equal to or greater than a radial depth $R_2$ of axial grooves defined between adjacent ones of the full length splines 72 and greater than the radial depth $R_0$. The radial depths $R_0$, $R_1$ and $R_2$ are measured with respect to a radial direction of the crank axle receiving opening 56 from the central axis A of the crank axle receiving opening 56. In other words, the first recessed area 80 can be a region of the crank axle receiving opening 56 with an enlarged minimum radius as compared to the region of the full length splines 72. In the illustrated embodiment, the radial depth $R_1$ of the first recessed area 80 is slightly greater than the radial depth $R_2$ of the axial grooves defined between adjacent ones of the full length splines 72.

Figure 9:
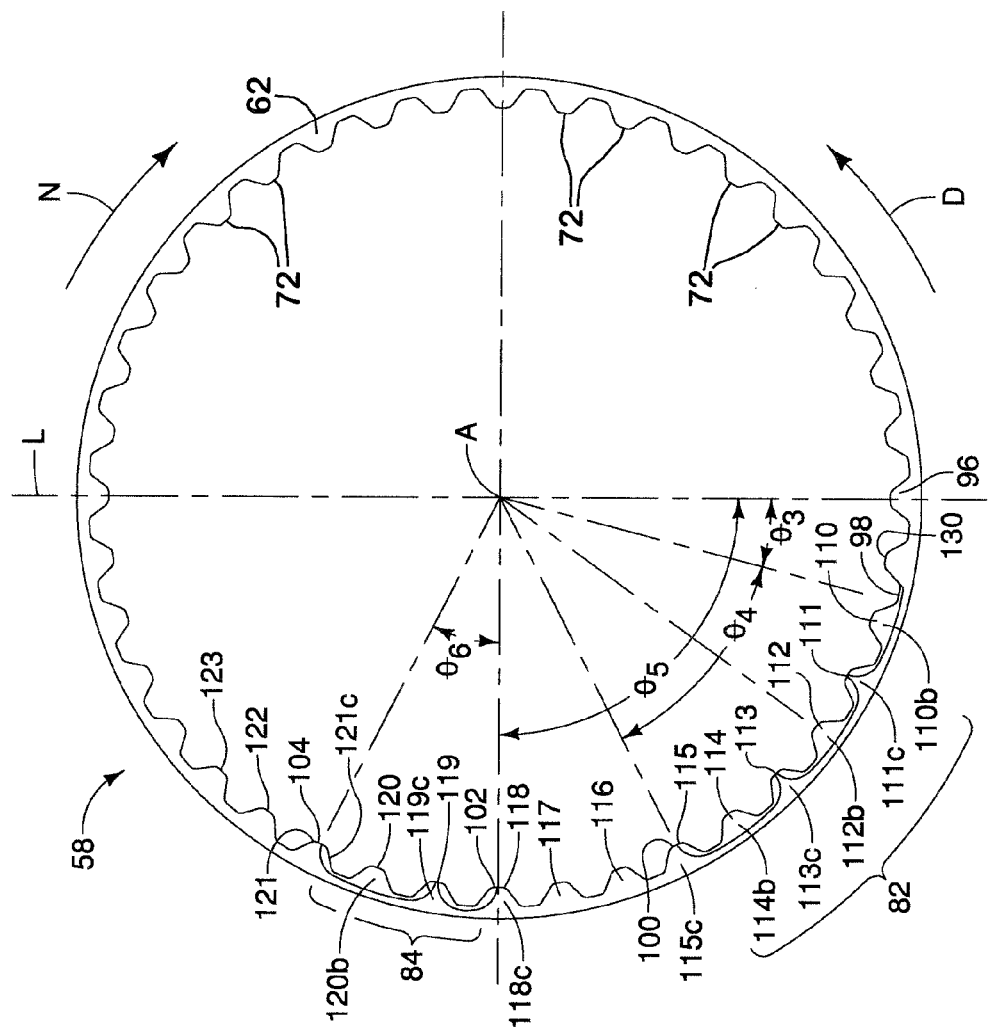
FIG. 9 is a back side elevational view of the axle coupling structure of the right crank arm illustrated in FIGS. 1 to 5.
Figure 14:
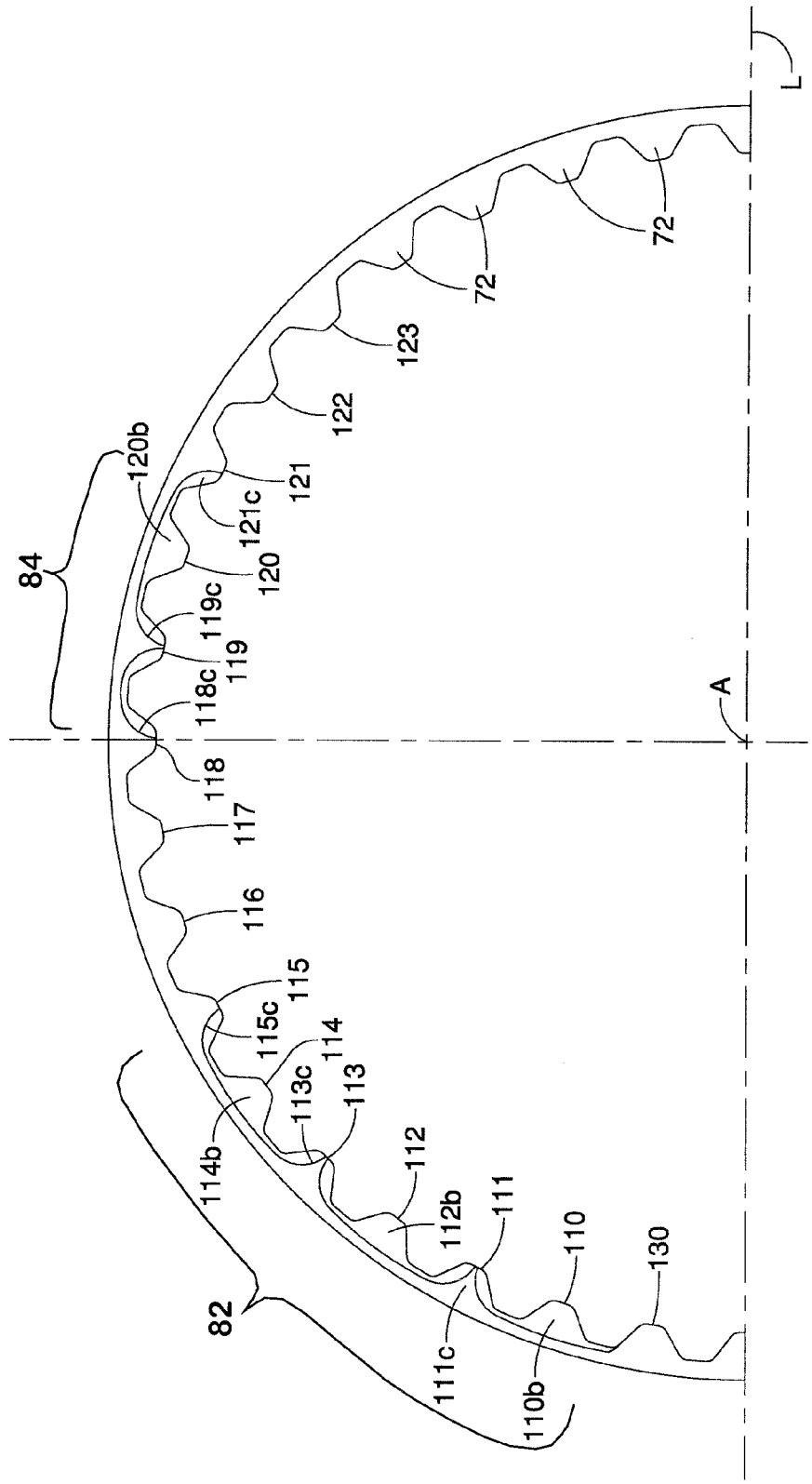
FIG. 14 is a back side schematic view of a portion of the axle coupling structure of the right crank arm illustrated in FIGS. 1 to 5.

FIG. 9 is a schematic view of the axle coupling structure 58 looking from the back side surface 42 of the right crank arm 30. In other words, the view in FIG. 9 is taken from an opposite side of the right crank arm 30 compared to the view shown in FIG. 8. FIG. 14 is shows a portion of the schematic rendering of FIG. 9, on an enlarged scale. As indicated in FIGS. 9 and 14, the second recessed area 82 of the axle coupling structure 58 has a starting point 98 positioned at a third circumferential location and an ending point 100 located at a fourth circumferential location. As shown in FIG. 9, the starting point 98 of the second recessed area 82 is positioned at a starting angle $\theta_3$ that is in a range between ten degrees and twenty degrees as measured in the non-driving force direction N of the right crank arm 30 from the first intersection 96. As described above, the first intersection 96 is defined between the longitudinal axis L of the right crank arm 30 and the crank axle receiving opening 56 that is closest to the second end 52 of the right crank arm 30.

As is also indicated in FIG. 9, the second recessed area 82 of the axle coupling structure 58 extends through an angle $\theta_4$ that is at least forty-five degrees in the circumferential direction of the crank axle receiving opening 56. The angle $\theta_4$ is measured between the starting point 98 and the ending point 100.

As is best shown in FIG. 11, the second recessed area 82 has a radial depth $R_3$ that is at least equal to or greater than the radial depth $R_2$ of axial grooves defined between adjacent ones of the full length splines 72. In the illustrated embodiment, the radial depth $R_3$ of the second recessed area 82 is greater than the radial depth $R_2$ of the axial grooves defined between adjacent ones of the full length splines 72. The radial depth $R_3$ is measured with respect to a radial direction of the crank axle receiving opening 56 from the central axis A. In other words, the second recessed area 82 can be a region of the crank axle receiving opening 56 with an enlarged minimum radius as compared to the region of the full length splines 72.

As is also indicated in FIGS. 9 and 14, the third recessed area 84 of the axle coupling structure 58 has a starting point 102 and an ending point 104. The starting point 102 is positioned at a fifth circumferential location. The ending point 104 is located at a sixth circumferential location. As best shown in FIG. 9, the starting point 102 of the third recessed area 84 is positioned at a starting angle $\theta_5$ that is in a range between eighty degrees and ninety degrees as measured in the non-driving force direction N of the right crank arm 30 from the first intersection 96. As described above, the first intersection 96 is defined between the longitudinal axis L of the right crank arm 30 and the crank axle receiving opening 56 that is closest to a second end 52 (the pedal attachment end) of the right crank arm 30.

The third recessed area 84 of the axle coupling structure 58 extends through an angle $\theta_6$. The angle $\theta_6$ is at least ten degrees in the circumferential direction of the cranks-axle receiving opening 56 between the starting point 102 and the ending point 104. The radial depth of the third recessed area 84 is preferably the same as the radial depth $R_3$ of the second recessed area 82.

As mentioned above, the first, second and third recessed areas 80, 82 and 84 are defined by the truncated ends of the short splines. Specifically, the truncated ends of corresponding ones of the short splines are positioned within one or more of the first, second and third recessed areas 80, 82 and 84, as described in greater detail below.

In the following description of the splines, the term "truncated end" is used, as well as the term "reduced end section". More specifically, some of the splines described below have truncated ends and some of the splines have reduced end sections. The terms "truncated ends" and "reduced end sections" are not interchangeable or synonymous. Specifically, the term "truncated end" refers to the complete removal of an end section of one of the short splines where that end section of the spline is completely removed or eliminated thereby defining one of the first, second and third recessed areas 80, 82 and 84. The right crank arm 30 also includes additional splines where an end section has not been completely removed, but rather, that end section has undergone a reduction of its overall radial profile. In other words, a reduced end section (or reduced end portion) is an end section of a spline that has been reduced in size, but has not been completely removed.

A detailed description is now provided for the short splines with specific reference to FIGS. 8-10, 12, 13 and 14. The short splines are sequentially arranged splines 110 through 123. Specifically, the short splines 110, 111, 112, 113, 114, 115, 116, 117, 118, 119, 120, 121, 122 and 123 constitute short splines because the short splines 110 through 123 include various truncated ends that define the first recessed areas 80, 82 and 84.

As indicated in FIGS. 8, 10 and 12-14, the first recessed area 80 adjacent to the front side surface 40 of the crank arm 30 extends from at least the short spline 111 to just past the short spline 123. In other words, as shown in FIG. 8 of the illustrated embodiment, the starting point 90 of the first recessed area 80 at least coincides with or is adjacent to the short spline 111. It should be understood from the drawings and the description herein that the starting point 90 defining the circumferential end of the first recessed area 80 can be considered to begin at the short spline 110. In the illustrated embodiment, the ending point 92 of the first recessed area 80 coincides with or is adjacent to the short spline 123. However, the first recessed area 80 can extend further in the non-driving force direction N of the right crank arm 30 if needed.

As is indicated in FIGS. 9 and 12-14, the second recessed area 82 extends from just prior to the short spline 110 to about midway along the short spline 115 adjacent to the back side surface 42 of the crank arm 30. In other words, as shown in FIG. 9 of the illustrated embodiment, the starting point 98 of the second recessed area 82 coincides with or is adjacent to a spline 130 (a full length spline that is adjacent to the short spline 110) and the ending point 100 of the second recessed area 82 coincides with or is adjacent to the short spline 115.

Further, as is also indicated in FIGS. 9 and 12-14, the third recessed area 84 extends from about midway along the short spline 118 to about midway along the short spline 121 adjacent to the back side surface 42 of the crank arm 30. In other words, as shown in FIG. 9, the starting point 102 of the third recessed area 84 coincides with or is adjacent to the short spline 118 and the ending point 104 of the second recessed area 82 coincides with or is adjacent to the short spline 121.

The short splines 111 through 123 each include a respective first truncated end 111a through first truncated end 123a that correspond to and define the first recessed area 80. More specifically, a portion of each of the short splines 111 through 123 (inclusive) has been completely removed or eliminated thereby defining the first recessed area 80.

As described below, the short splines 111 through 123 extend in the axial direction of the crank axle receiving opening 56 with at least the truncated ends 111a through 123a positioned adjacent the first axial end edge 60 such that the short splines 111 through 123 do not extend completely to the first axial end edge 60. In other words, in the region of the first recessed area 80, the short splines 111 through 123 do not extend completely to the first axial end edge 60, thereby forming the first recessed area 80. In addition, as described below, the short splines 110, 112, 114 and 120 also do not extend completely to the second axial end edge 62 for defining a part of one of the second and third recessed areas 82 and 84. Also each of the short splines 111, 113, 115, 118, 119 and 121 has a reduced end section that defines a part of one of the second and third recessed areas 82 and 84.

More specifically, as shown in FIGS. 8, 10, 12 and 13, the short splines 111 through spline 123 are disposed adjacent to one another and have the truncated ends 111a through 123a.

The truncated ends 111a through 123a have differing dimensions such that the first recessed area 80 has a wedge or triangular shape. Further, the adjacent short splines 111 through 123 are arranged relative to each other such that the first recessed area 80 is progressively wider in the axial direction as the first recessed area 80 extends in the driving force direction D of the crank arm 30. Hence, the truncated ends 111a through 123a of the short splines 111 through 123 are adjacent the first axial end edge 60 and define the arc shaped first recessed area 80.

Further, the first recessed area 80 can be further be defined by a reduced end section 110c of the short spline 110, as indicated in FIG. 8. In other words, the end of the short spline 110 adjacent to the first axial end edge 60 can include a reduced radial profile that defines one circumferential end of the first recessed area 80. It should be understood from the drawings and the description herein that the reduced end section 110c can be omitted such that the short spline 111 defines the starting point 90 for one of the circumferential ends of the first recessed area 80. Alternatively, the reduced end section 110c can be included as part of the first recessed area 80.

Figure 12:
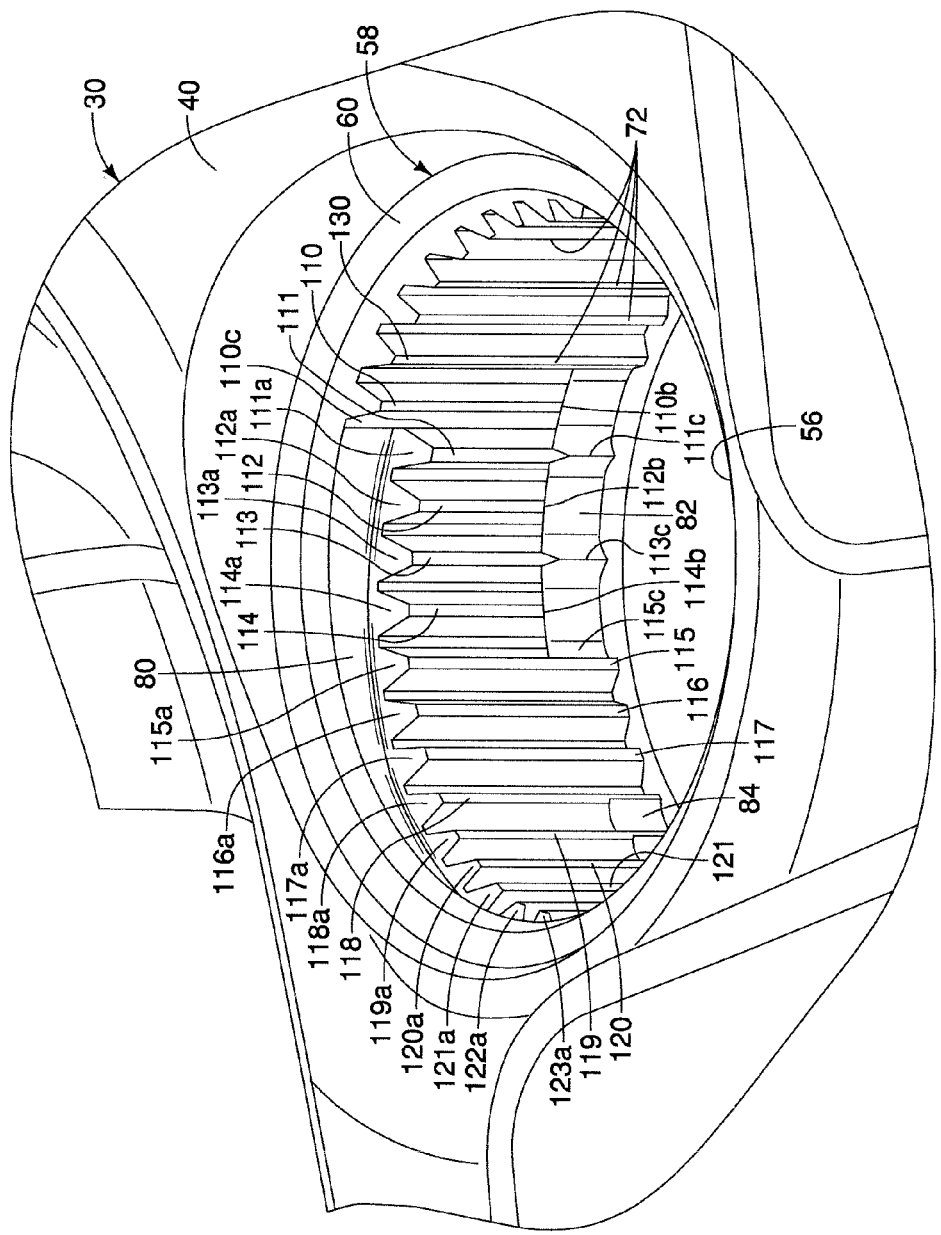
FIG. 12 is an enlarged, front side perspective view of a portion of the axle coupling structure illustrated in FIG. 6, showing the front side of the axle coupling structure.
Figure 13:
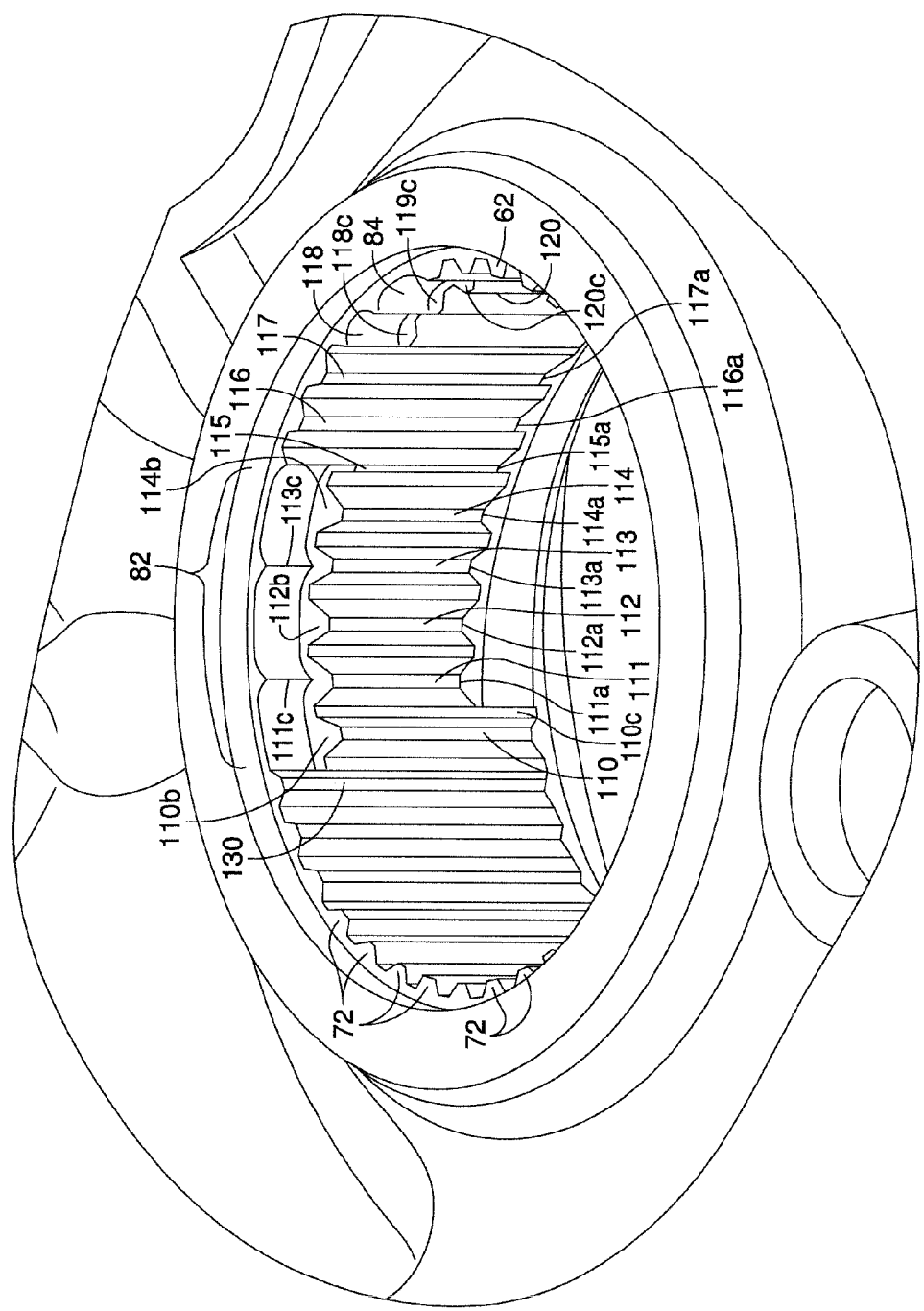
FIG. 13 is an enlarged, back side perspective view of a portion of the axle coupling structure illustrated in FIG. 7, showing the back side the axle coupling structure.

More specifically, the truncated end 123a corresponds to only a small section of the short spline 123 having been removed. The truncated end 122a corresponds to slightly larger section of the short spline 122 having been removed, compared to the short spline 123. The truncated end 121a corresponds to slightly larger section of the short spline 121 having been removed, compared to the short spline 122. The truncated end 120a corresponds to slightly larger section of the short spline 120 having been removed, compared to the short spline 121. The truncated end 119a corresponds to slightly larger section of the short spline 119 having been removed, compared to the short spline 120. The slightly larger relative sizes of the truncated ends 118a, 117a, 116a, 115a, 114a, 113a and 112a continues in an ever increasing manner with the short splines 118, 117, 116, 115, 114, 113 and 112 as the axial width of the first recessed area 80 increases, as indicated in FIGS. 10, 12 and 13. Finally, the truncated end 111a corresponds to a greater section of the short spline 111 having been removed, compared to each of the short splines 123 through the short spline 112.

It should be understood from the drawings and the description herein that many of the short splines that define the first recessed area 80 have differing overall axial lengths relative to one another. For example, as indicated in FIG. 10, the overall axial length of the short spline 116 is greater than the overall axial length of the short spline 115. The overall axial length of the short spline 117 is greater than the overall axial length of the short spline 116. Similarly, the overall axial length of the short spline 123 is greater than the overall axial length of the short splines 122, 116 and 115.

As best shown in FIGS. 12 and 13, the short splines 110, 112 and 114 have truncated ends 110b, 112b and 114b at the second axial end edge 62 that define a part of the second recessed area 82. Specifically, the truncated ends 110b, 112b and 114b correspond to sections of the short splines 110, 112 and 114 adjacent to the second axial end edge 62 that have been completely removed to define a part of the second recessed areas 82. It should be appreciated that the short spline 112 had truncated ends 112a and 112b, and the short spline 114 has truncated ends 114a and 114b.

The short splines 111 and 113 also include corresponding reduced end sections 111c and 113c, as shown in FIGS. 9, 12, 13 and 14. Hence, the short splines 111 and 113 constitute additional splines provided with reduced end sections. Since the short splines 111 and 113 (e.g., additional splines) extend completely to the second axial end edge 62, the short splines 111 and 113 aid in preventing the O-ring R from being undesirably displaced in the axial direction due to the presence of the second recessed area 82. Further, the short spline 115 includes a reduced end section 115*c*, as shown in FIGS. 9, 12, 13 and 14 and therefore also constitutes an additional spline that extend completely to the second axial end edge 62 for aiding in preventing the O-ring R from being undesirably displaced in the axial direction due to the presence of the second recessed area 82. Similarly, the full length spline 130 can also include a reduced end section (not shown) that at least partially defines the second recessed area 82 and therefore also constitutes an additional spline. Consequently, the short splines 111 and 113 extend in the axial direction and are disposed in an alternating pattern with the short splines 110, 112 and 114. (Further, the short splines 111 and 113 (which constitute additional splines) have corresponding reduced end sections 111*c* and 113*c* located at the second axial end edge 62. In other words, the reduced end sections 111*c* and 113*c* extend to the second axial end edge 62. Consequently, the reduced end portions 111*c* and 113*c* partially define the second recessed area 82 of the axle coupling structure 58 together with the recesses defined by the truncated ends 110*b*, 112*b* and 114*b* of the short splines 110, 112 and 114.

As indicated in FIGS. 9 and 14, the second recessed area 82 and the third recessed area 84 are circumferentially spaced apart from one another. Further, the second recessed area 82 and the third recessed area 84 have similar features, such as having at least one spline that constitutes an additional spline having a reduced end section. However, the second recessed area 82 has a greater circumferential length than the third recessed area 84.

The third recessed area 84 is at least partially defined by a truncated end 120*b* of the short spline 120, as indicated in FIGS. 9, 10 and 14. Further, the short splines 118, 119 and 121 each includes a reduced end section, the reduced end sections 118*c*, 119*c* and 121*c*, as best shown in FIGS. 9 and 14. Consequently, the short splines 118, 119 and 121 each constitute an additional spline. Since the short splines 118, 119 and 121 (e.g., additional splines) extend completely to the second axial end edge 62, the short splines 118, 119 and 121 also aid in preventing the O-ring R from being undesirably displaced in the axial direction due to the presence of the third recessed area 84.

As is best shown in FIGS. 12 and 13, the short splines 112, 114 and 120 have two truncated ends. Specifically, the short spline 112 has the truncated end 112*a* at the first recessed area 80 and the truncated end 112*b* at the second recessed area 82. Similarly, the short spline 114 has the truncated end 114*a* at the first recessed area 80 and the truncated end 114*b* at the second recessed area 82. As well, the short spline 120 has the truncated end 120*a* at the first recessed area 80 and the truncated end 120*b* at the third recessed area 84. The short splines 112, 114 and 120 have axial lengths measured in the axial direction of the crank axle receiving opening 56 that are greater than 45% of a length of the full length splines 72. Further, the short splines 112, 114 and 120 have respective truncated end 112*a*, 114*a* and 120*a* positioned adjacent the first axial end edge 60 and the short splines 112, 114 and 120 have respective truncated end 112*b*, 114*b* and 120*b* positioned adjacent the second axial end edge 62.

The inclusion of the truncated ends of the short splines and the reduced end sections of the splines of the right crank arm 30 can reduce the concentrations of stress that occur at the axle coupling structure 58. Further, the circumferential positioning of the first, second and third recessed areas 80, 82 and 84 correspond to areas of anticipated concentrations of stress between the right crank arm 30 and the crank axle 34.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "inbound", "outbound", "forward", "rearward", "above", "downward", "vertical", "horizontal", "below" and "transverse" as well as any other similar directional terms refer to those directions of a bicycle equipped with the bicycle crank assembly. Accordingly, these terms, as utilized to describe the bicycle crank assembly should be interpreted relative to a bicycle equipped with the bicycle crank assembly as used in the normal riding position on a flat horizontal surface. However, with respect to the terms "front side surface" and "back side surface" as used to describe the crank arm refers to an installed position such that "front side surface" faces in the outbound direction and the "back side surface" faces in the outbound direction of the bicycle. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A bicycle crank assembly comprising:
 a crank arm including a front side surface and a back side surface, the crank arm having a crank axle mounting portion with a crank axle receiving opening defined by an axle coupling structure having a first axial end edge adjacent the front side surface of the crank arm and a second axial end edge adjacent the back side surface of the crank arm,
 the axle coupling structure at least including a plurality of full length splines extending completely in an axial direction of the crank axle receiving opening from the first axial end edge to the second axial end edge, a plurality of adjacent first short splines extending in the axial direction each having a first truncated end positioned adjacent the first axial end edge such that the first short splines extend to the second axial end edge and do not extend completely from the second axial end edge to the first axial end edge, and a plurality of adjacent second short splines extending in the axial direction each having a second truncated end positioned adjacent the second axial end edge such that the second short splines do not extend completely from the first axial end edge to the second axial end edge.

2. The bicycle crank assembly according to claim 1, further comprising
a crank axle mounted into the crank axle receiving opening with a press-fitted engagement with the axle coupling structure.

3. The bicycle crank assembly according to claim 1, wherein
the first short splines having the first truncated end positioned adjacent the first axial end edge define an arc shaped first recessed area that extends in a circumferential direction relative to a central axis of the crank axle receiving opening.

4. The bicycle crank assembly according to claim 3, wherein
the first recessed area includes a starting point positioned at a first circumferential location and an ending point located at a second circumferential location, with the starting point of the first recessed area being positioned at a starting angle of between twenty degrees and thirty degrees in a non-driving force direction of the crank arm from an intersection of a longitudinal axis of the crank arm and the crank axle receiving opening that is closest to a pedal attachment end of the crank arm, with the longitudinal axis of the crank arm passing through a central axis of the crank axle receiving opening.

5. The bicycle crank assembly according to claim 4, wherein
the first recessed area extends at least ninety-five degrees in the circumferential direction of the crank axle receiving opening between the starting and ending points of the first recessed area.

6. The bicycle crank assembly according to claim 4, wherein
the second truncated ends of the second short splines are each axially spaced from the second axial end edges by a recess that has a radial depth that is at least equal to or greater than a radial depth of axial grooves defined by the full length splines with the radial depths being measured with respect to a radial direction of the crank axle receiving opening.

7. The bicycle crank assembly according to claim 6, wherein
the recesses defined by the second truncated ends of the second short splines are positioned within a second recessed area of the axle coupling structure that has a starting point positioned at a third circumferential location and an ending point located at a fourth circumferential location, with the starting point of the second recessed area being positioned at a starting angle of between ten degrees and twenty degrees in a non-driving force direction of the crank arm from an intersection of a longitudinal axis of the crank arm and the crank axle receiving opening that is closest to a pedal attachment end of the crank arm, with the longitudinal axis of the crank arm passing through a central axis of the crank axle receiving opening.

8. The bicycle crank assembly according to claim 7, wherein
the second recessed area of the axle coupling structure extends at least forty-five degrees in the circumferential direction of the crank axle receiving opening between the starting and ending points of the second recessed area.

9. The bicycle crank assembly according to claim 7, wherein
the axle coupling structure further includes additional short splines extending in the axial direction and disposed in an alternating pattern with the second short splines, each of the additional splines having a reduced end portion located at the second axial end edge so that the reduced end portions partially define the second recessed area of the axle coupling structure together with the recesses defined by the second truncated ends of the second short splines.

10. The bicycle crank assembly according to claim 7, wherein
the recesses defined by the second truncated ends of the second short splines are positioned within a third recessed area of the axle coupling structure that has a starting point positioned at a fifth circumferential location and an ending point located at a sixth circumferential location, with the starting point of the third recessed area being positioned at a starting angle of between eighty degrees and ninety degrees in a non-driving force direction of the crank arm from an intersection of a longitudinal axis of the crank arm and the crank axle receiving opening that is closest to a pedal attachment end of the crank arm, with the longitudinal axis of the crank arm passing through a central axis of the crank axle receiving opening.

11. The bicycle crank assembly according to claim 10, wherein
the third recessed area of the axle coupling structure extends at least ten degrees in the circumferential direction of the cranks-axle receiving opening between the starting and ending points of the third recessed area.

12. The bicycle crank assembly according to claim 10, wherein
the axle coupling structure further includes an additional spline extending in the axial direction, the additional spline having a reduced end portion located at the second axial end edge so that the reduced end portion partially defines the third recessed area of the axle coupling structure together with the recesses defined by the second truncated ends of the second short splines.

13. The bicycle crank assembly according to claim 3, wherein
the first recessed area extends at least ninety-five degrees in the circumferential direction of the crank axle receiving opening.

14. The bicycle crank assembly according to claim 3, wherein
the first recessed area has a radial depth that is at least equal to or greater than a radial depth of axial grooves defined by the full length splines with the radial depths being measured with respect to a radial direction of the crank axle receiving opening.

15. The bicycle crank assembly according to claim 3, wherein
the first short splines are arranged relative to each other such that the first recessed area is progressively wider in the axial direction as the first recessed area extends in a non-driving force direction of the crank arm.

16. The bicycle crank assembly according to claim 1, wherein
the second short splines includes at least three of the short splines, and
the axle coupling structure further includes two additional short splines extending in the axial direction with the additional short splines being disposed between the second short splines such that the second short splines and the additional short splines alternate in a circumferential direction relative to a central axis of the crank axle receiving opening.

17. The bicycle crank assembly according to claim 1, wherein
the first short splines include a plurality of short splines having axial lengths measured in the axial direction of the crank axle receiving opening that are greater than 45% of a length of the full length splines.

18. The bicycle crank assembly according to claim 1, wherein
the second short splines each having a truncated end positioned adjacent the first axial end edge.

19. The bicycle crank assembly according to claim 1, wherein
the first short splines each having the truncated end positioned adjacent the first axial end edge to define a first recessed area that extends in a circumferential direction of the crank axle receiving opening, and some of the second short splines having a truncated end positioned adjacent the second axial end edge to at least partially define a second recessed area and a third recessed area that extend in the circumferential direction along the second axial end edge, with the second recessed area and the third recessed area being circumferentially spaced apart.

20. The bicycle crank assembly according to claim 19, wherein
the first recessed area includes a starting point positioned at a first circumferential location and an ending point located at a second circumferential location, with the starting point of the first recessed area being positioned at a starting angle of between twenty degrees and thirty degrees in a non-driving force direction of the crank arm from an intersection of a longitudinal axis of the crank arm and the crank axle receiving opening that is closest to a pedal attachment end of the crank arm, with the longitudinal axis of the crank arm passing through a central axis of the crank axle receiving opening.

21. The bicycle crank assembly according to claim 20, wherein
the first recessed area extends at least ninety-five degrees in the circumferential direction of the crank axle receiving opening between the starting and ending points of the first recessed area.

22. The bicycle crank assembly according to claim 20, wherein
the second recessed area includes a starting point positioned at a third circumferential location and an ending point located at a fourth circumferential location, with the starting point of the second recessed area being positioned at a starting angle of between ten degrees and twenty degrees in a non-driving force direction of the crank arm from an intersection of a longitudinal axis of the crank arm and the crank axle receiving opening that is closest to a pedal attachment end of the crank arm, with the longitudinal axis of the crank arm passing through a central axis of the crank axle receiving opening.

23. The bicycle crank assembly according to claim 22, wherein
the second recessed area of the axle coupling structure extends at least forty-five degrees in the circumferential direction of the crank axle receiving opening between the starting and ending points of the second recessed area.

24. The bicycle crank assembly according to claim 22, wherein
the third recessed area includes a starting point positioned at a fifth circumferential location and an ending point located at a sixth circumferential location, with the starting point of the third recessed area being positioned at a starting angle of between eighty degrees and ninety degrees in a non-driving force direction of the crank arm from an intersection of a longitudinal axis of the crank arm and the crank axle receiving opening that is closest to a pedal attachment end of the crank arm, with the longitudinal axis of the crank arm passing through a central axis of the crank axle receiving opening.

25. The bicycle crank assembly according to claim 24, wherein
the third recessed area of the axle coupling structure extends at least ten degrees in the circumferential direction of the cranks-axle receiving opening between the starting and ending points of the third recessed area.

* * * * *